United States Patent [19]

Itoh et al.

[11] 4,311,024
[45] Jan. 19, 1982

[54] HERMETICALLY CIRCULATING, ABSORPTION TYPE REFRIGERATOR

[75] Inventors: Masahiko Itoh, Hitachiota; Heihatiro Midorikawa; Akira Minato, both of Hitachi, all of Japan

[73] Assignee: Hitachi, Ltd., Tokyo, Japan

[21] Appl. No.: 104,469

[22] Filed: Dec. 17, 1979

[30] Foreign Application Priority Data

Dec. 25, 1978 [JP] Japan ............................. 53-158566

[51] Int. Cl.³ ............................................. F25B 43/00
[52] U.S. Cl. ........................................ 62/474; 62/112; 252/389 R
[58] Field of Search .................. 62/112, DIG. 20, 85, 62/474, 476; 252/69, 389 R; 165/134 R; 204/43; 21/25

[56] References Cited

U.S. PATENT DOCUMENTS

| | | | |
|---|---|---|---|
| 2,457,334 | 12/1948 | Widell | 62/474 X |
| 2,580,983 | 1/1952 | Widell | 62/474 X |
| 3,555,841 | 1/1971 | Modahl et al. | 62/474 |
| 3,723,347 | 3/1973 | Mitchell | 252/389 R |

FOREIGN PATENT DOCUMENTS 1521759 11/1972 Fed. Rep. of Germany ... 252/389 R

*Primary Examiner*—Lloyd L. King
*Attorney, Agent, or Firm*—Thomas E. Beall, Jr.

[57] ABSTRACT

A hermetically circulating, absorption type refrigerator based on a closed circulation system comprised of a successive communication of a regenerator, a condenser, an evaporator, an absorber and a heat exchanger, parts or the whole of said constituent members in contact with an absorbing solution being comprised of a copper material selected from copper and copper alloy, and refrigeration being produced by repetitions of concentration, refrigerant dilution and heat exchange of an aqueous lithium bromide solution sealed in the circulation system is characterized in that the absorbing solution is an aqueous lithium bromide solution containing (a) a nitrate and (b) at least one triazole compound selected from benzotriazole and tolyltriazole, and has a particularly distinguished corrosion resistance.

15 Claims, 2 Drawing Figures

HERMETICALLY CIRCULATING, ABSORPTION TYPE REFRIGERATOR

The present invention relates to a hermetically circulating, absorption type refrigerator, where refrigeration is produced by repetitions of concentration, refrigerant dilution, and heat exchange of an aqueous lithium bromide solution as an absorbing solution.

The hermetically circulating, absorption type refrigerator uses water as a refrigerant and an aqueous concentrated lithium bromide solution as an absorbing solution. Principle of such a refrigerator will be explained below, referring to the accompanying drawings.

Figure 1:
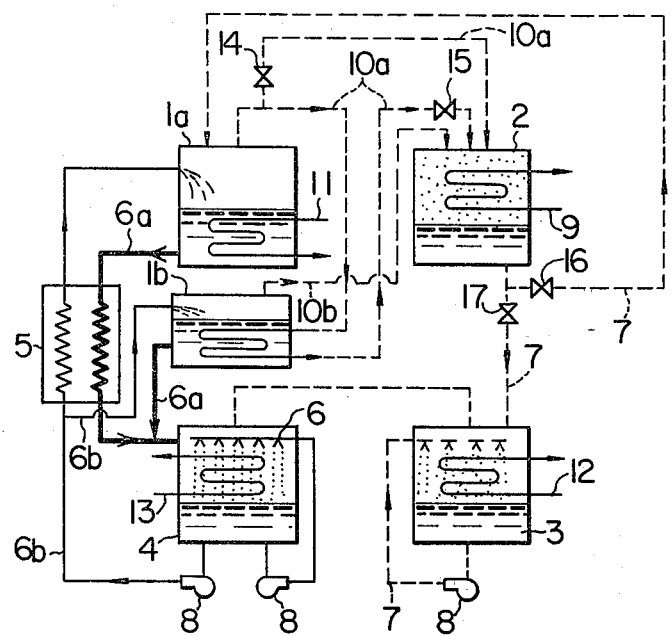
FIG. 1 is a schematic flow diagram showing the principle of a refrigerator according to one embodiment of the present invention.

In FIG. 1, a refrigerator is comprised of regenerators 1a and 1b, a condensor 2, an evaporator 3, an absorber 4, pumps 8 for circulating absorbing solutions 6, 6a and 6b, and a refrigerant 7 between the above-mentioned constituent members, and a heat exchanger 5, and the respective constituent members function as follows:

(A) Evaporator 3

Cold water 12 passes through the tube inside of an evaporator tube bundle in the evaporator 3, and a refrigerant 7 is sprayed onto the tube outside of the tube bundle, where the cold water is deprived of heat by the latent heat of evaporation of the refrigerant.

(B) Absorber 4

An aqueous lithium bromide solution has a considerably lower vapor pressure than that of the water at the same temperature, and can absorb water vapor generated at a considerably low temperature. The refrigerant evaporated in the evaporator 3 is absorbed into the aqueous lithium bromide solution (absorbing solution) 6 onto the outside of a tube bundle in the absorber 4, and the heat of absorption generated thereby is cooled by cooling water 13 passing through the inside of the tube bundle.

(C) Regenerators 1a and 1b

A dilute solution 6b that has absorbed the refrigerant in the absorber 4 has a lowered concentration and thus has a weak absorbability. A portion of the dilute solution 6b is led to a high temperature regenerator 1a by a solution recycle pump 8, and heated by high temperature steam 11, etc., whereby the refrigerant vapor 10a is evaporated and separated, whereas the solution is concentrated therein, and the resulting concentrated solution 6a is returned to the absorber 4. A portion of the dilute solution 6b leaving the absorber 4 is led to a low temperature regenerator 1b by the solution recycle pump 8, and heated and concentrated by the refrigerant vapor 10a generated in the high temperature regenerator 1a, whereas the resulting concentrated solution 6a is returned to the absorber 4.

(D) Condenser 2

The refrigerant vapor 10a and 10b separated in the regenerator 1a is led to a condenser 2, cooled by cooling water 9 passing through the inside of a tube bundle, and condensed and liquefied, and the resulting liquid refrigerant 7 is returned to the evaporator 3.

(E) Heat exchanger 5

The dilute solution 6b of low temperature going to the regenerator 1a from the absorber 6 is preheated by the concentrated solution 6a going to the absorber 4 from the regenerator 1a to reduce the heat load to the regenerator 1a.

(F) Pumps 8

Pumps 8 circulate the dilute solution 6b and the refrigerant 7.

The absorber 4, regenerators 1a and 1b and pumps 8 perform the same function as that of the compressor of a compression type refrigerator. The absorbing liquids 6, 6a and 6b circulate between the regenerators 1a and 1b through the heat exchanger 5 during the operation of the refrigerator. In general, the higher the concentration of the absorbing solution, the higher the refrigeration efficiency. Thus, the regenerators 1a and 1b must be kept at a higher temperature to concentrate the absorbing solution.

On the other hand, if the aqueous lithium bromide solution has a higher temperature and a higher concentration, the solution will have a higher corrosiveness to steel or copper as materials of construction of the refrigerator. Thus, it is indispensable to add an inhibitor to the absorbing solution to prevent the corrosion.

The inhibitors so far practically employed are, in the most cases, chromates, and in some cases molybdates, etc. are also employed, but their use is restricted to a very narrow field owing to the poor solubility at a low temperature. All the foregoing inhibitors are oxidizing agents, and are of such a type as to form a dense protective film on the surface of iron, thereby suppressing the corrosion. However, it is difficult to completely protect all the kinds of the materials of construction used in a refrigerator (for which usually several different kinds of the materials of construction are used) from corrosion. That is, the above-mentioned inhibitors have no anti-corrosive effect upon copper materials, and, to the contrary, promote corrosion. At that time, the dissolved copper ions may deposit on the surface of iron, and the iron is more liable to undergo corrosion owing to a difference in potential between these two metals.

On other hand, organic inhibitors showing an anti-corrosive effect upon the copper materials have a problem in their stability at the regenerator, etc. which reach a high temperature such as 160° C. or higher during the refrigerating operation, and furthermore have a poor anti-corrosive effect upon the iron materials of the regenerator susceptible to the most vigorous corrosion.

An object of the present invention is to provide a hermetically circulating, absorption type refrigerator having a distinguished anti-corrosiveness to an aqueous lithium bromide solution.

Another object of the present invention is to provide a hermetically circulating, absorption type refrigerator having a high anti-corrosiveness and a high cooling effect.

The present invention provides a hermetically circulating, absorption type refrigerator based on a closed circulation system comprised of a successive communication of a regenerator, a condenser, an evaporator, an absorber and a heat exchanger, parts or the whole of said constituent members in contact with an absorbing solution being comprised of a copper material selected from copper and copper alloy, and refrigeration being produced by repetitions of concentration, refrigerant dilution, and heat exchange of an aqueous lithium bromide solution sealed in the circulation system (which will be hereinafter referred to briefly as "refrigerator") characterized in that said absorbing solution contains a substantially sufficient amount of the following compounds (a) and (b) for functioning as an inhibitor:

(a) a nitrate, and (b) a triazole compound selected from benzotriazole and tolyltriazole.

In the present invention, $NO_3$ ions in the inhibitor can oxidize the surface of members comprised of iron or iron alloy, thereby forming a dense, passivated film comprised mainly of $FE_3O_4$, and furthermore can form a sparingly soluble film comprised of $FE\text{-}C_6H_4N_3H$ complexes on the surface of said film, which seems to produce an effect of suppressing corrosion. On the other hand, the triazole compound in the inhibitor acts upon the members comprised of copper or copper alloy, thereby forming a sparingly soluble film represented by the following formula

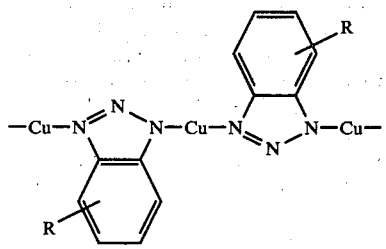

, wherein R is H or $CH_3$, which seems to produce an effect of suppressing corrosion.

The present invention is effective not only for a single effect, hermetically circulating, absorption type refrigerator, but also especially for a double effect, hermetically circulating, absorption type refrigerator, because the present inhibitor is better in solubility than the molybdate inhibitor, and consequently there is no fear of deposition and precipitation even if the absorbing solution is cooled down to a lower temperature.

The nitrate (a) to be used as the inhibitor in the present invention includes nitrates of alkali metals such as lithium, sodium, potassium, etc., among which lithium nitrate is particularly preferable.

The present invention is characterized by a combination of the nitrate with at least one of the triazole compound (b) selected from benzotriazole ($C_6H_4N_3N$) and tritriazole ($CH_3C_6H_3N_3H$) as an inhibitor showing a good stability at the high temperature to which the absorbing solution is exposed during the refrigerating operation and also showing a good anti-corrosive effect for a long period of time.

Amounts of the nitrate and the triazole compound in the absorbing solution, that is, concentrations, must be such to prevent the corrosion to the iron material and the copper material with a good balance. That is, the concentration of nitrate is practically in a range of 0.005 to 0.1% by weight, preferably 0.01 to 0.05% by weight. On the other hand, the triazole compounds, that is, benzotriazole and tolyltriazole, have a low solubility in water, particularly a very low solubility in an aqueous concentrated lithium bromide solution. For example, the solubility in an aqueous 55% lithium bromide solution is about 0.13 to about 0.15% at room temperature, and thus the triazole compound at a concentration higher than the solubility may deposit when the operation of the refrigerator is stopped, though depending upon the ambient temperature condition, and sometimes such troubles as nozzle clogging, etc. due to the accumulation of the deposit may be brought about. Thus, the concentration of the triazole compound is practically in a range of 0.001 to 0.12% be weight, preferably 0.005 to 0.1% by weight.

In the present invention, the absorbing solution can contain 5 to 50 ml/l of a surfactant such as octyl alcohol to enhance the heat efficiency of the absorber, and the inhibitor of the present invention is never extracted thereby.

In the refrigerator of the present invention, it is preferable to use the constituent members comprised of the copper material selected from copper and copper alloy in the circulating system, after a portion or the entirety of copper oxides generated and attached on the surface in contact with the absorbing solution has been removed therefrom beforehand, that is, before sealing the absorbing solution into the circulating system, and it is possible to increase the cooling effect of the refrigerator by using the constituent members having the copper oxides removed.

As a result of the studies, the present inventors have confirmed that the triazole compound (b) of said combination of inhibitors reacts with copper ions in the absorbing solution to form compounds of $-C_6H_4N_3Cu-$, etc., from which precipitates are formed and deposited on piping, etc. Thus, the present inventors have made various studies in view of a possibility to further improve the cooling effect, and as a result, the present inventors have successfully attained the present invention.

In the present invention, the copper oxide may be removed before assembling the refrigerator or by washing with an acid, etc. after the assembling of the refrigerator but before sealing the absorbing solution into the refrigerator. The copper oxide itself can be removed according to the well known procedure, for example, by said washing with an acid, washing by an aqueous solution of its salts, for example, sodium nitrate, sodium sulfate, etc., or by a mechanical procedure such as sand blast, etc., or by reduction, etc. Practically simplest procedure is the washing with an acid or an aqueous solution of its salts, for example, sodium nitrate (which will be hereinafter referred to merely as "acid washing"). The acid to be used in the present invention includes, for example, inorganic acids such as hydrochloric acid, nitric acid, hydrobromic acid, sulfuric acid, phosphoric acid, etc., and organic acids such as citric acid, etc. The salt includes, for example, lithium bromide, sodium bromide, lithium nitrate, sodium sulfate, sodium phosphate, etc. In brief, well known acids capable of reacting with the copper oxide and dissolving it, and their salts can be used in the present invention. In view of removal by dissolution of the copper oxide on the surface of copper material, and the influence upon the copper material, nitric acid and lithium bromide are most preferable. The higher the concentration of acid, the more vigorous the corrosion action. Thus, the practically preferable concentration of acid is in a range of 0.5 to 10% weight. In the case of the aqueous solution of salt, on the other hand, a higher concentration is more preferable. Generally, the concentration of an aqueous solution of the salt is preferably 20% by weight, or higher.

The higher the acid washing temperature, the shorter the washing time, but the more vigorous the corrosion action. Practically preferable temperature for the acid washing is in a range of the normal temperature to about 80° C. Circulation time of 10 minutes or more can satisfy the desired object, and generally 10 to 30 minutes is preferable. Immediately after the completion, it is desirable to make sufficient washing with water.

When the acid washing is carried out after the assembling of the refrigerator according to the present invention, an acid is circulated within the circulating system, and after the completion of the acid washing, the acid is replaced with water, and water washing is sufficiently carried out. When the washing water becomes substantially neutral, the water must be discharged from the circulating system. In that case, said triazole compound can be added to the acid or the aqueous solution of its salt as the inhibitor, and the removal of the copper oxide and the formation of an anti-corrosion film can be effected at the same time thereby. This is thus very advantageous.

It is most desirable to remove substantially all of the copper oxide, but if not fulfilled it is necessary to remove the copper oxide at least to such a degree that the precipitates formed by the reaction of the remaining copper oxide with the triazole compound may not substantially clog the injection nozzle 14 for the absorbing solution in FIG. 1. Its amount depends upon the structure of a refrigerator, size of nozzle, etc.

In the present invention, the constituent materials of construction for a refrigerator somewhat depend upon the kind of heat source such as combustion gas of fuel gas, kerosene, etc. or steam, etc., but the effect of the present invention is remarkable on all the kinds of the constituent materials. Especially the effect is remarkable on the refrigerator having a higher ratio of the copper material used. Furthermore the absorbing solution of the present invention has no fear of environmental pollution, when compared with the solution using a chromate, etc.

The present invention will be described in detail, referring to Examples.

EXAMPLES 1-8

0.2% by weight of lithium hydroxide was added to an aqueous 22 wt. % lithium bromide solution, and then admixed with an aqueous solution containing lithium nitrate and benzotriazole separately prepared, and an absorbing solution was prepared thereby.

The resulting solution was sealed into a refrigerator using structural carbon steal, oxygen-free copper (ASTM 102) and 9:1 cupronickel (ASTM 703) as the materials of construction, and subjected to corrosion test at 160° C. in vacuum for 200 hours. The amount of corrosion at that time is shown in the following Table 1. The structure of the refrigerator used is a steam-heated, double effect, hermetically circulating, absorption type refrigerator shown in FIG. 1. In Table 1, test results of the so far used absorbing solution containing an inorganic inhibitor is also given for comparison as conventional Example.

TABLE 1

| | Lithium nitrate concentration (wt. %) | Benzotriazole concentration (wt. %) | Corrosion ($mg/dm^2$) | | |
| --- | --- | --- | --- | --- | --- |
| | | | Carbon steel | Copper | Cupronickel |
| Example 1 | 0.035 | 0.005 | 320 | 45 | 40 |
| Example 2 | " | 0.01 | 280 | 23 | 15 |
| Example 3 | " | 0.05 | 250 | 20 | 12 |
| Example 4 | " | 0.1 | 252 | 20 | 13 |
| Example 5 | 0.003 | 0.05 | 350 | 18 | 10 |
| Example 6 | 0.01 | " | 310 | 19 | 11 |
| Example 7 | 0.05 | " | 340 | 50 | 18 |
| Example 8 | 0.1 | " | 360 | 80 | 19 |
| Example 9 | 0.15 | " | 430 | 130 | 23 |
| Conventional Example | Lithium chromate (0.3 wt. %) | | 500 | 300 | 180 |

In the conventional example, sharp and deep pitting corrosion was generated, and the amount of corrosion fluctuated, and thus an average of 10 test pieces were employed. On the other hand, in the examples of the present invention test pieces were covered with a uniform black thin film after the test.

As is evident from Table 1, the corrosion in the examples of the present invention is considerably reduced, as compared with the conventional example using the inorganic inhibitor, and particularly the anti-corrosion effect upon the copper material is remarkable. The effect upon the iron material is also remarkable, and the anti-corrosion effect upon both the materials can be said to be balanced in view of the structure of the apparatus.

EXAMPLE 10

An absorbing solution was prepared in the same manner as in the foregoing examples except that 0.08% by weight of tolyltriazole was used in place of benzotriazole.

The resulting absorbing solution was applied to the same refrigerator as used in the foregoing examples, and subjected to a corrosion test. It was found that the amount of corrosion of carbon steel was 280 $mg/dm^2$, that of copper 18 $cm/gm^2$, and that of cupronickel 14 $mg/dm^2$.

EXAMPLE 11

Figure 2:
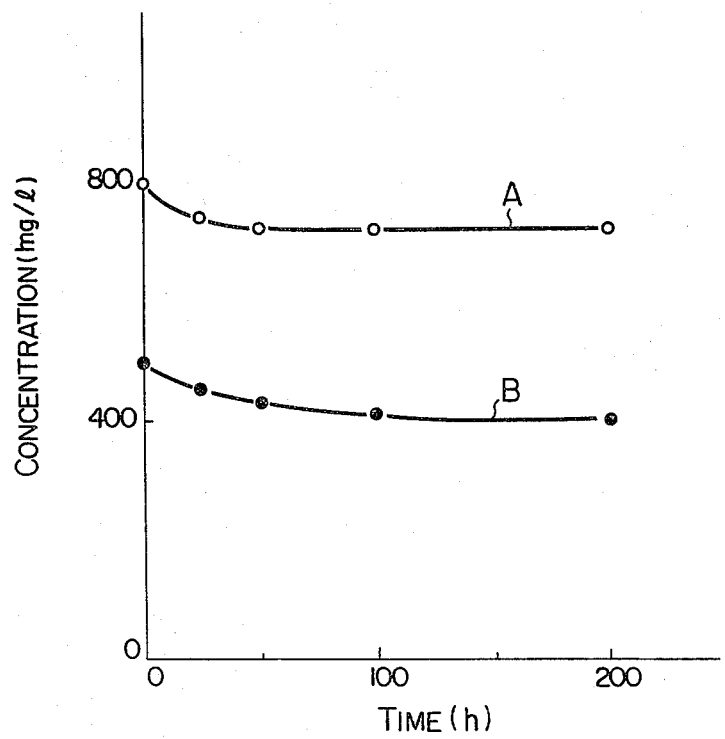
FIG. 2 is a graph showing a change with time in inhibitor concentration in an absorbing solution for the refrigerator of the present invention.

25 ml/l of n-octyl alcohol, 500 mg/l of lithium nitrate (concentration: 0.033 wt. %), and 800 mg/l of benzotriazole (concentration: 0.05 wt. %) were added to an aqueous solution containing 62% by weight of lithium bromide and 0.2% by weight of lithium hydroxide to prepare an absorbing solution. As a model test, a carbon steel plate and a copper plate (each surface area: 12 $cm^2$) were dipped in 10 ml of the thus prepared absorbing solution, and kept at 160° C. Consumptions of benzotriazole and lithium nitrate were measured at that time. The results are shown in FIG. 2.

Benzotriazole (curve A) is slightly consumed right after the start of test, but its consumption is very small on the whole, and no extraction by n-octyl alcohol is observed. Consumption of lithium nitrate is also very small (curve B). It is seen from these facts that the absorbing solution of the present invention has a good stability. In an actual refrigerator test, no substantial change was observed in the inhibitor concentration even after one-year operation.

EXAMPLE 12

500 l of an aqueous 40 wt. % lithium bromide solution (copper oxide-removing agent) containing 0.033% by weight of lithium nitrate and 0.05% by weight of benzotriazole as inhibitors was sealed in a steam-heated, double effect, hermetically circulating, absorption type refrigerator. After the inside of the refrigerator was brought to a pressure of less than 10 mm Hg by means of a vacuum pump, a high temperature regenerator was heated to make the temperature of the solution 80° C., and then the solution was circulated by means of a circulating pump for 30 minutes. Then, the pump was stopped, and the solution was discharged out of the refrigerator. In the discharged solution, green precipitates were suspended. Then, 1,000 l of water for washing was sealed into the refrigerator, and the water was circulated at the normal temperature for 10 minutes by means of the pump, and then discharged out of the refrigerator. The washing operation was repeated three times, and then the water was completely discharged out of the refrigerator. Then, an absorbing solution prepared by adding 0.033% by weight of lithium nitrate and 0.005% by weight of benzotriazole to an aqueous solution containing 55% by weight of lithium bromide and 0.2% by weight of lithium hydroxide (pH adjusting agent) was sealed into the refrigerator, and subjected to an actual operation. A portion of the absorbing solution within the refrigerator was sampled after the actual operation of 300 hours, to investigate the corrosion state of the inside and the consumption of the inhibitor. The results are shown in the following Table 2. As Experimental Example, said absorbing solution was directly sealed into the refrigerator without any removal of the copper oxide, and subjected to an actual operation, and the results are also given in the same Table 2.

In addition, a cooling efficiency was investigated, and it was found that the cooling effect of the refrigerator of Example 12 was 2 to 2.5% higher than that of Experimental Example. The cooling effect was determined by using a double effect, hermetically circulating, absorption type refrigerator having a refrigeration capacity of 150 refrigeration tons, using a liquefied natural gas (LNG) as fuel, carrying out a full load operation at a combustion gas rate of 105 Nm$^3$/hr and a cooling water flow rate of 90 m$^3$/hr, and measuring an inlet temperature and an outlet temperature of the cooling water.

EXAMPLE 13

Operation was carried out in the same manner as in Example 12, except that an acid washing was carried out with an aqueous 3 wt. % nitric acid solution containing 0.1% by weight of benzotriazole for a washing time of 20 minutes. The results are given in the following Table 2. In addition, a cooling efficiency was investigated, and it was found 3 to 4% higher than that of said Experimental Example.

EXAMPLE 14

Operation was carried out in the same manner as in Example 13, except that an aqueous 3 wt. % nitric acid solution containing 0.1% by weight of tolyltriazole as an inhibitor was used, and 0.033% by weight of lithium nitrate and 0.08% by weight of tolyltriazole were added as the complex inhibitor of the actual absorbing solution. The results are shown in the following Table 2. In addition, a cooling efficiency was investigated, and it was found 3 to 4% higher than that of said Experimental Example.

TABLE 2

| | Fouling of absorbing solution by precipitate | Copper ions dissolved in absorbing solution (mg/dm$^2$) | Remaining inhibitor (%) | |
|---|---|---|---|---|
| | | | Lithium nitrate | Triazole compound |
| Example 12 | None | 4.1 | 0.026 | 0.043 |
| Example 13 | " | 1.7 | 0.018 | 0.045 |
| Example 14 | " | 1.9 | 0.018 | 0.070 |
| Experimental Example | Green precipitate | 13.2 | 0.01 | 0.02 |

As is evident from Examples 12–14, the absorbing solution is not fouled in the present invention, and thus such troubles as deposition of precipitates onto the pipings, etc., or clogging of spray nozzles can be prevented, and also a remarkable anti-corrosion effect can be attained, thereby greatly reducing the corrosion of copper or copper alloy. In addition, consumption of complex inhibitor in the absorbing solution can be greatly suppressed, and a stable corrosion-controlling action can be maintained. The present invention can successfully attain these distinguished effects.

The present refrigerator can be also used as a room heater. As the room heater, operation is carried out as follows:

In the case of room heater operation, a heating-cooling switch valve 14 is opened, whereas a valve 15 is closed, and a refrigerant switch valve 16 is opened, whereas a valve 17 is closed. As the room heater, the high temperature regenerator and the condenser are used. Refrigerant vapor 10 heated and generated in the high temperature regenerator 1a passes through the heating-cooling switch valve 15 and enters the condenser 2 to heat the cooling water 9 and turn it to warm water. The warm water is used for room heating. The liquid refrigerant formed in the condenser 2 passes through the refrigerant switch valve 17 and returns to the high temperature regenerator 1a to dilute the concentrated absorbing solution, and the liquid refrigerant is heated to generate the refrigerant vapor 10.

What is claimed is:

1. A hermetically circulating, absorption type refrigerator based on a closed circulation system of constituent members comprised of a successive communication of a regenerator, a condenser, an evaporator, an absorber and a heat exchanger, parts or the whole of said constituent members in contact with an absorbing solution being comprised of steel and a copper material selected from copper and copper alloy, and refrigeration being produced by repetitions of concentration, refrigerant dilution, and heat exchange of an aqueous concentrated lithium bromide solution sealed in the circulation system, characterized in that said absorbing solution contains the following compounds (a) and (b) for function as a corrosion inhibitor:
    (a) a nitrate of an alkali metal, and
    (b) a triazole compound selected from benzotriazole and tolyltriazole in an amount of 0.01 to 0.05% by weight of the nitrate and 0.005 to 0.1% by weight of the triazole compound.

2. A hermetically circulating absorption type refrigerator according to claim 1, wherein the nitrate is lithium nitrate.

3. A hermetically circulating, absorption type refrigerator according to claim 1, wherein the absorbing solution contains the following compounds (a) to (c):
   (a) a nitrate of an alkali metal,
   (b) a triazole compound selected from benzotriazole and tolyltriazole, and
   (c) octyl alcohol.

4. A hermetically circulating, absorption type refrigerator according to claim 2, wherein the absorbing solution contains the following compounds (a) to (c):
   (a) a nitrate of an alkali metal,
   (b) a triazole compound selected from benzotriazole and tolyltriazole, and
   (c) octyl alcohol.

5. A hermetically circulating, absorption type refrigerator according to claim 3, wherein the octyl alcohol has a concentration of 5 to 50 ml/l.

6. A hermetically circulating, absorption type refrigerator according to claim 5, wherein the nitrate is lithium nitrate.

7. A hermetically circulating, absorption type refrigerator according to claim 1, wherein copper oxide is generated and deposited on the surface of the constituent members comprised of copper and copper alloy in contact with the absorbing solution, said copper oxide being removed before the absorbing solution is inserted, at least in an amount enough to prevent clogging in the circulating system.

8. A hermetically circulating, absorption type refrigerator according to claim 3, wherein copper oxide is generated and deposited on the surface of the constituent members comprised of copper and copper alloy in contact with the absorbing solution, said copper oxide being removed before the absorbing solution is inserted, at least in an amount enough to prevent clogging in the circulating system.

9. A hermetically circulating, absorption type refrigerator according to claim 1, wherein copper oxide deposited on the surface of the members comprised of copper material is substantially removed from the surface of the members in contact with the absorbing solution.

10. A hermetically circulating, absorption type refrigerator according to claim 1, wherein at least a heat-exchanging part of the member in contact with the absorbing solution in the circulating system is comprised of copper material.

11. A hermetically circulating, absorption type refrigerator according to claim 3, wherein at least a heat-exchanging part of the member in contact with the absorbing solution in the circulating system is comprised of copper material.

12. A hermetically circulating, absorption type refrigerator according to claim 5, wherein at least a heat-exchanging part of the member in contact with the absorbing solution in the circulating system is comprised of copper material.

13. A hermetically circulating, absorption type refrigerator according to claim 7, wherein at least a heat-exchanging part of the member in contact with the absorbing solution in the circulating system is comprised of copper material.

14. A hermetically circulating, absorption type refrigerator according to claim 8, wherein at least a heat-exchanging part of the member in contact with the absorbing solution in the circulating system is comprised of copper material.

15. A hermetically circulating, absorption type refrigerator according to claim 9, wherein at least a heat-exchanging part of the member in contact with the absorbing solution in the circulating system is comprised of copper material.

* * * * *